United States Patent [19]

Erlichman

[11] Patent Number: 4,607,866
[45] Date of Patent: Aug. 26, 1986

[54] PROTECTIVE SLEEVE DEVICE

[76] Inventor: Max Erlichman, 461 Nelo St., Santa Clara, Calif. 95050

[21] Appl. No.: 585,236

[22] Filed: Mar. 1, 1984

[51] Int. Cl.⁴ ............................................. F16L 11/12
[52] U.S. Cl. ...................................... 285/45; 285/91; 285/381; 285/419; 285/423; 285/921; 138/99; 174/DIG. 8; 428/192
[58] Field of Search ................. 285/45, 373, 381, 419, 285/364, 365, 406, 407, DIG. 16, 293, 423, DIG. 22, 91; 138/99, 168, 167; 174/DIG. 8; 428/192

[56] References Cited

U.S. PATENT DOCUMENTS

| | | | |
|---|---|---|---|
| 3,379,218 | 4/1968 | Conde | 138/99 |
| 3,530,898 | 9/1970 | Wilson | 285/381 X |
| 3,850,451 | 11/1974 | Matthiessen | 285/45 X |
| 4,084,844 | 4/1978 | Abner | 285/DIG. 22 X |
| 4,176,756 | 12/1979 | Gellman | 285/DIG. 22 X |
| 4,365,393 | 12/1982 | Hauffe et al. | 285/373 X |
| 4,371,578 | 2/1983 | Thompson | 138/99 X |
| 4,403,794 | 9/1983 | Curran et al. | 285/45 |

Primary Examiner—Dave W. Arola

[57] ABSTRACT

A protective plastic sleeve device is provided to be wrapped around, and hence to seal, the juncture along a joined series of elongated pipes, cables, conduits or similar members. The sleeve device includes a plastic sheet whose end portions are folded back and attached, to form a pair of passageways. Rods extend through each of the passageways. Apertures are provided along the end portions to communicate with the passageways. Engagement means, advantageously in the form of alternative male and female members, project from the rods through the apertures to interlock the rods together and hence retain the end portions of the sheet in juxtaposed confronting relationship.

8 Claims, 7 Drawing Figures

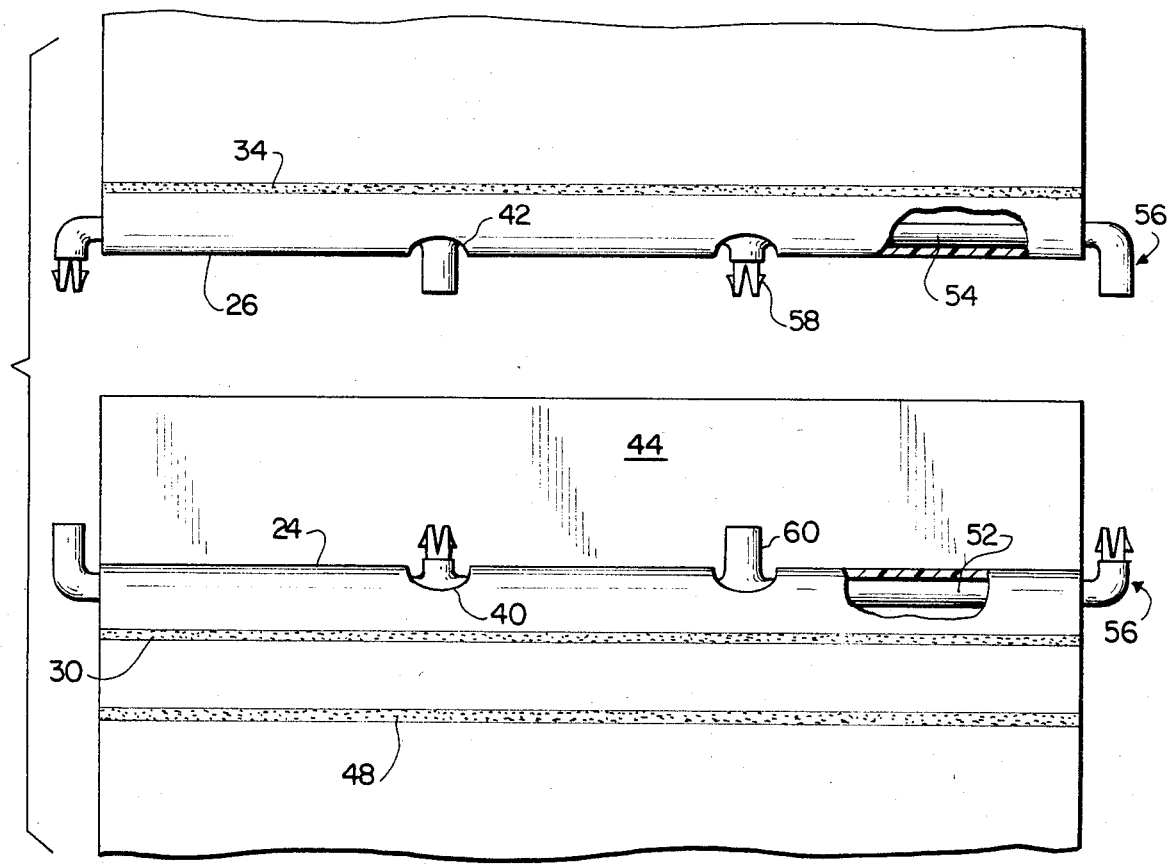
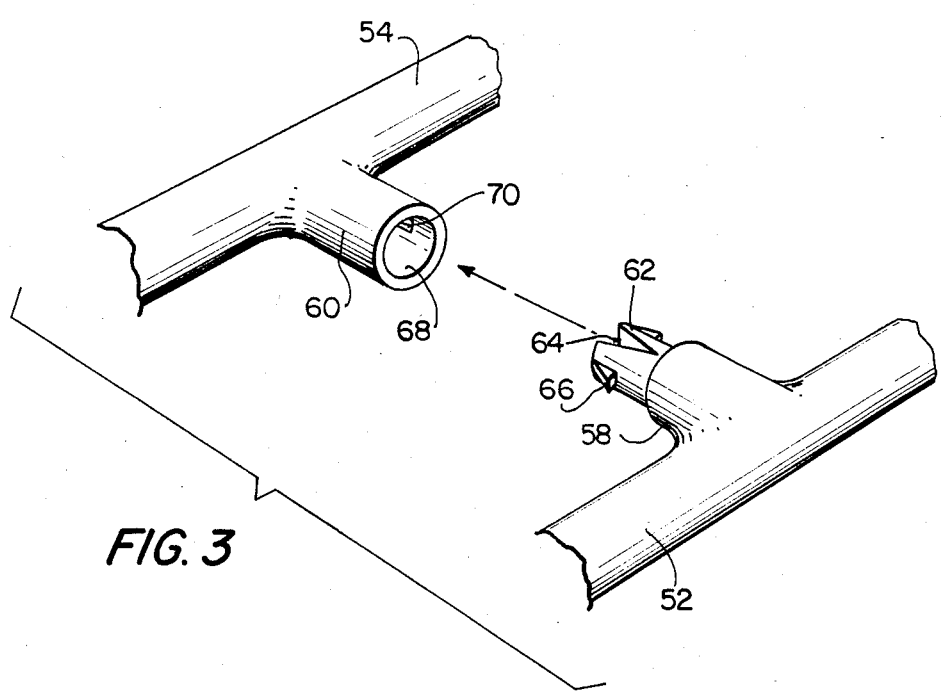

PROTECTIVE SLEEVE DEVICE

This invention relates to a new and improved plastic sleeve device formed in part of shrinkable protective tubing and adapted to be wrapped around, and hence to seal, the juncture along a joined series of elongated pipes, cables, conduits or similar members.

It is known in the art, and forms no part of this invention, that certain types of shrinkable protective tubing can be used for protecting joints, fittings and welds by which pipes, cables, conduits and other elongated members are joined, one to the other, in an elongated string. One well-known type of material for forming such protective sleeve is the heat shrinkable type, which, when applied over a joint and subjected to heat, shrinks tightly into contact with the members forming a joint. Another lesser known but still widely used type of shrinkable tubing material, and that to which the present invention is advantageously addressed, is a shrinkable protective tube which has been treated with chemicals to bring the same to a dilated or enlarged state. This type of tubing remains dilated or enlarged so long as it is kept out of contact with the air; however, once the tubing contacts the ambient air, it shrinks back to its initial size without any application of heat.

In forming protective sleeves of this type, it is recognized that the sleeves must be applied at a juncture along a continuous pipe or conduit, which is often elevated or submerged. Thus, it is not possible to simply slip the protective sleeve over an open end, but rather, some means must be provided to tightly wrap the sleeve device around this juncture, and then to connect the wrapped ends of the sleeve together.

Protective sleeve devices have been known and disclosed in the prior art. Examples thereof are disclosed in U.S. Pat. No. 3,379,218 to Conde, in U.S. Pat. No. 3,530,898 to Wilson, and in U.S. Pat. No. 4,371,578 to Thompson. All of these patents disclose sleeve devices formed of a heat shrinkable plastic material with some type of interconnection means applied along the opposed edges of the sleeve. In the Conde patent, the interconnection means are formed integrally with the sleeve. In the Wilson patent, a single hinge-like closure is formed by passing a rod through interlocking loops at the opposed edges of the sleeve. In the Thompson patent, metallic clip members are attached to the opposed edges of the sleeve to enable the clips to be engaged with one another.

In contrast to these prior art devices, the present invention contemplates interlocking connecting devices which are formed separately from, and are not directly attached to, the material forming the sleeve; yet, which can be interlocked positively to link the edges of the sleeve together. The arrangement of the present invention is particularly useful in connection with sleeves which are formed of plastic material of the type which has been chemically dilated and which shrinks upon exposure to ambient air.

Referring now to the drawings which form a part of this original disclosure:

FIG. 2 is an fragmentary elevational view showing a segment of the sleeve and one suitable form of interconnecting means for use therewith.

FIG. 3 is a fragmentary perspective view showing the details of one form of engagement means useful in the present invention.

Figure 1:
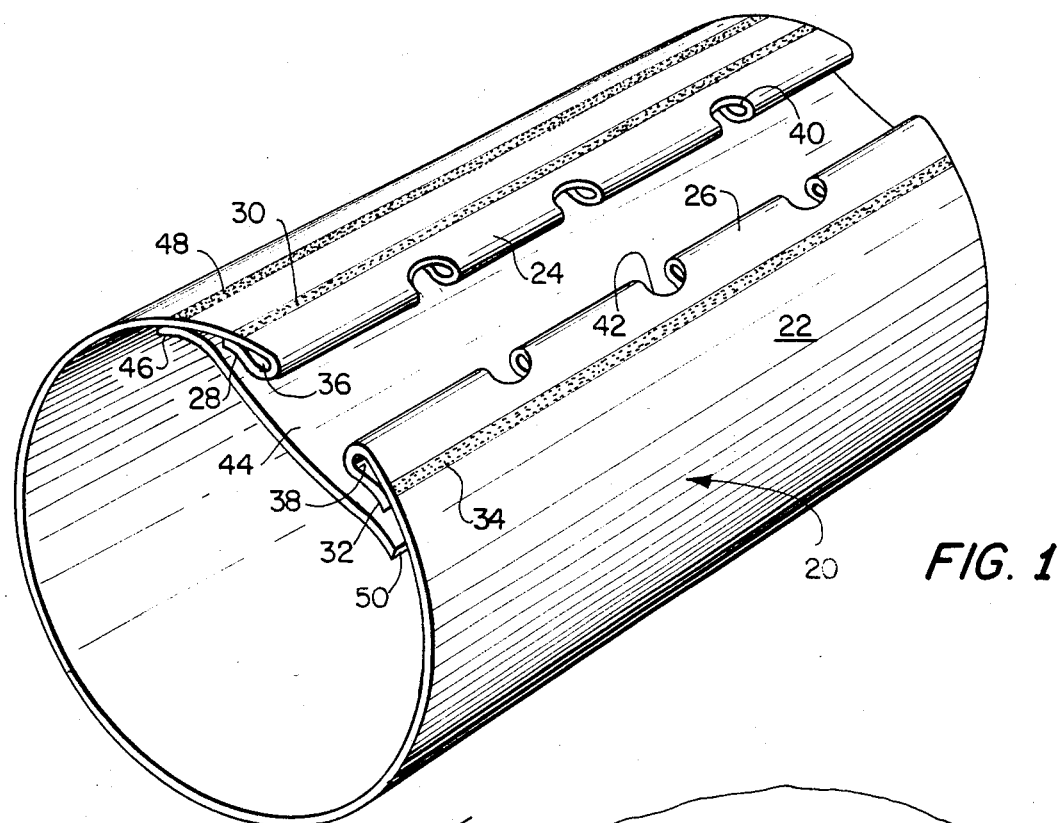
FIG. 1 is a perspective view of the sleeve forming material, without the interconnecting means inserted therein.

Referring now to the drawings in further detail, there is shown in FIG. 1 a sheet of sleeve forming material converted into a tubular configuration or sleeve generally designated 20. The sleeve is formed of an elastomeric material of any suitable and stretchable material such as rubber or plastic. One advantageous material for the sheet 22 which forms the sleeve is silicone rubber. Another advantageous material is polyvinyl chloride.

The material forming the sheet 22 is preferably chemically dilated, as, for example, by application of a fluorocarbon solvent onto the material of the sleeve. This causes the sleeve to become enlarged or dilated in size. When the solvent evaporates or volatilizes by exposure to the ambient air, the sleeve will simply shrink back from its dilated or enlarged size to its original size.

Although it is not illustrated, it will be understood that the material 22 forming the sleeve 20 is normally retained in hermetically sealed packaging until the time that the sleeve is ready for use.

The sleeve 20 is provided with opposed first and second side marginal areas 24 and 26 which are juxtaposed to each other in confronting relationship when the sleeve is formed into the cylindrical configuration illustrated in FIG. 1, which is the configuration in which the sleeve is normally used. The side marginal area 24 is formed by folding the end 28 back under itself and adhering it by means of a weld or other suitable attachment means 30 to the underside or innerside of the sleeve. The weld can be accomplished by ultrasonic welding, by heat melting, or by any other suitable permanent attachment means.

A similar arrangement is provided along the second side marginal area 26 by folding the sheet end 32 back under and attaching it by a similar weld designated 34.

As illustrated in FIG. 1, this folded arrangement of the ends of the sheet 22 provide first and second elongated passageways, respectively designated 36 and 38, extending longitudinally along the opposed side marginal areas of the sleeve.

A plurality of apertures 40 are provided along the first side marginal area 24 in open communication with the first longitudinal passageway 36. A similar series of apertures 42 are provided along the second side marginal area 26 in open communication with the second longitudinal passageway 38.

A flap of material 44 is provided along the inside of the sleeve 20, as illustrated in FIG. 1. This flap 44 can advantageously be formed of the same material as the sheet 22. The flap is adhered to the inside of the sleeve 20 by having one end 46 thereof welded, as shown at 48, to the material of the sleeve. The weld 48 can be similar to the welds 30 and 34. The opposed or free end 50 of the flap underlies the second side marginal area 26 of the sleeve.

It should be apparent that the sleeve 20 as illustrated in FIG. 1 can readily be wrapped around a pipe weld, a wire splice, or any other juncture of coupling for an elongated series of pipes, cables, or conduits or the like. However, there is no means illustrated in FIG. 1 for joining the opposed side marginal areas 24 and 26 together in a manner which will keep the sleeve in position. To accomplish such joining, the invention contemplates providing first and second axially elongated rods each having a spaced series of engagement means projecting therefrom transversely of the axis of elongation of the rods themselves. This is perhaps best illustrated in FIG. 2. The first axially elongated rod 52 is disposed within the first passageway 36. The second axially elongated rod 54 is disposed in the second elongated passageway 38. A series of engagement means generally designated 56 extend transversely from the rods 52 and 54. As shown in FIG. 2, these engagement means extend through the apertures 40 and 42 so that the engagement means carried by the rod 52 are directed in confronting relationship, and in alignment, with the engagement means extending from the rod 54.

Advantageously, the engagement means 56 are formed by alternating male and female connector members. In the FIG. 2 embodiment, the male connector members are designated 58 and the female connector members are designated 60. As is readily apparent to those skilled in the art, the male connector members 58 are engageable with the female connector member 60 when the side marginal areas of the sleeves are brought into closely juxtaposed position to one another. This interengagement between the male and female members in effect interlocks them and thus retains the edges of the sleeve in interlocked position.

The details of one form of engagement means are illustrated in FIG. 3. As shown in that figure, the male engagement member 58 includes a projecting portion 62 having a V-shaped opening 64 formed centrally therein to divide the member 58 into two separate arms. Each arm carries along its sides, a projection or hook-type element 66. The female member 60 includes a central socket opening 68 into which the forward portion of the male member 58 projects. Shoulder members 70 are provided within the socket 68 so that the hooks 66 can engage therewith when the male member is inserted into the female member. Advantageously, both the rods 52 and 54, and the engagement means 58 and 60 are formed of a flexible plastic material so that the male member deforms slightly when it is inserted into the socket of the female member, and then recovers to engage the hooks with the shoulders and thus lock the two members together.

Figure 4:
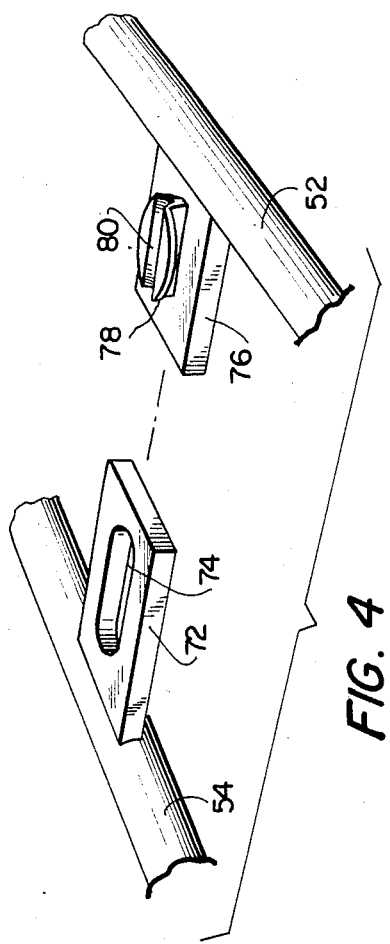
FIG. 4 is a fragmentary perspective view showing another form of engagement means suitable for the present invention.

A modified form of engagement means is illustrated in FIG. 4. In this figure, the female member is formed as a plate 72 attached to one of the rods, eith the plate having an elongated aperture 74 formed therein. The male connecting member is formed by a similar plate 76 attached to the other rod and a raised projecting button 78, having a size and configuration to fit in the aperture 74, is provided along a surface of the element 76. Again, a V-shaped opening 80 can be provided to divide the male button member into two separate arms which can deform when pushed through the opening 74 and then recover thereafter. It will be apparent that when the male and female members of the embodiment of FIG. 4 are interengaged with one another, the plate member 76 will be disposed beneath the plate member 72 and the male button member 78 will be projected through the opening 74.

Figure 5:
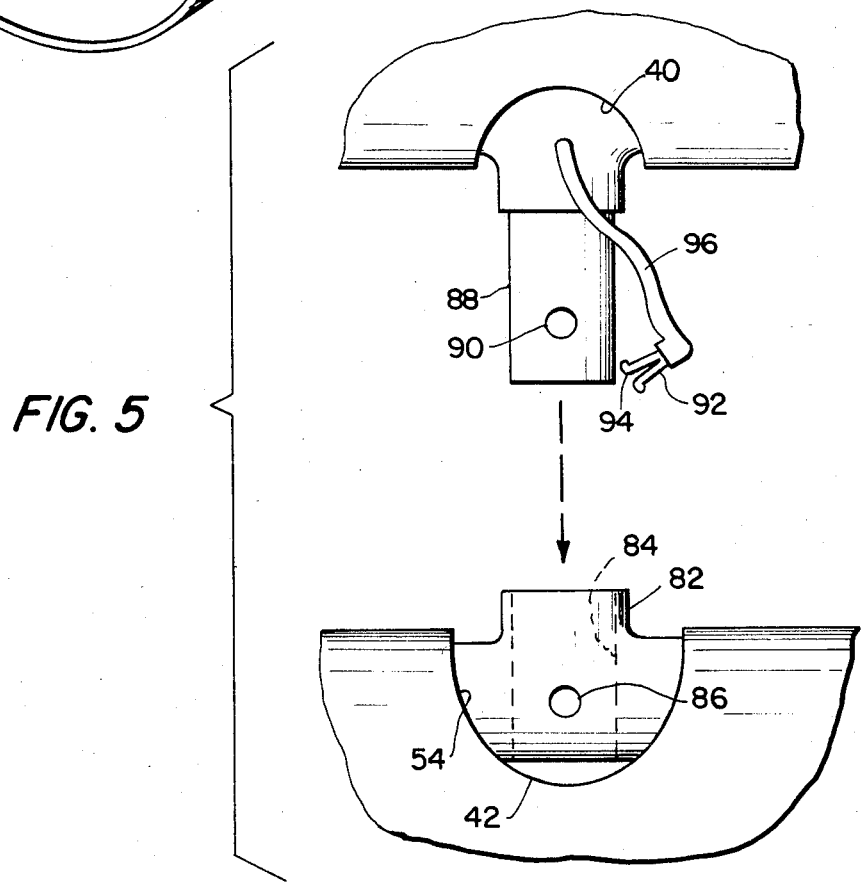
FIG. 5 is a fragmentary elevational view showing still another form of suitable engagement means for the present invention.

A still further modified form of engagement means is illustrated in FIG. 5. In this figure, the female member 82 includes a transverse aperture or socket 84 extending therethrough and a cross-drilled hole 86 disposed perpendicularly to both the axis of the socket 84 and the axis of elongation of the rod 54. The male member is formed by a pin element 88 of a size and configuration adapted to fit within the female socket 84. The male pin 88 has a hole 90 formed therein which will align with the hole 86 when the male and female members are connected. The male member 88 carries a retained pin 92 again having a V-shaped configuration 94 formed centrally therein to divide the same into two separate arms. A cable or other suitable attaching element 96 connects the pin with the male member. Thus, when the male and female members are engaged, and the holes 86 and 90 are in alignment with one another, the pin 92 can be passed through those aligned holes to interlock the elements with one another.

Figure 6:
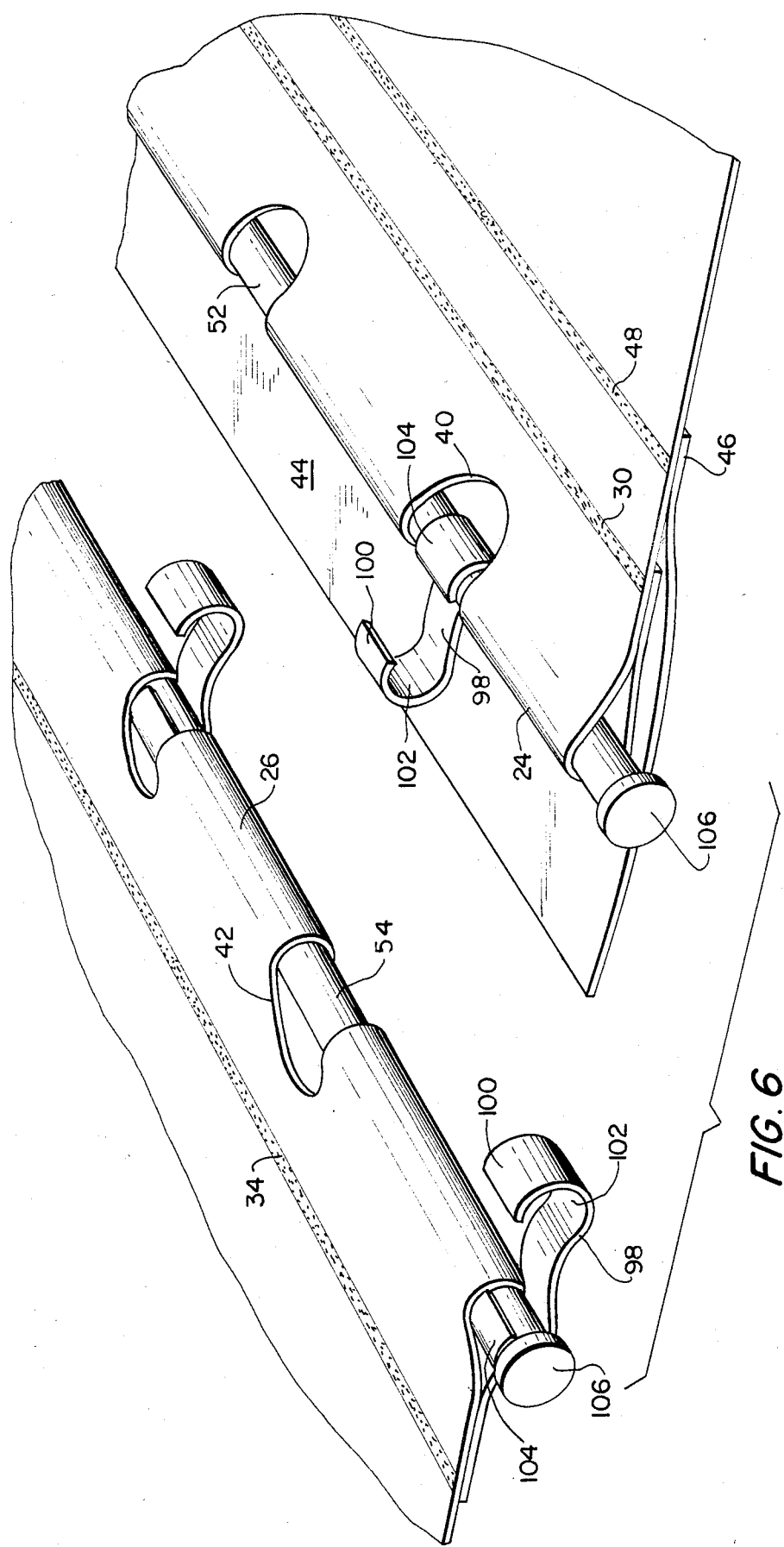
FIG. 6 is a fragmentary perspective view showing a further modified form of engagement means utilized in the present invention.

In FIG. 6, a still further modified form of interconnecting means is shown. In this figure, the male connecting members are formed as elongated hook elements 98 having a free end 100 which is bent around to form an opening 102 which is adapted and configured to fit about the longitudinal rods extending through the passageways. The hook members are connected at their opposite end 104 to the rod from which they project. If desired, enlarged ridges or shoulders 106 can be provided at the ends of the rods in the event that the hook members are simply slidably positioned along the rod.

The female connector member in the embodiment shown in FIG. 6 is provided by means of the exposed portion of the opposite rod at the area where the apertures are formed, or alternatively, extending beyond the ends of the sheet. Thus, the end 100 of the hook member fits through the aperture in the opposed sheet so that the opening 102 of the hook member can wrap around and engage with the rod 52 or 54, as the case may be. When all of the hooks are engaged with the exposed portion of the rods in the opposite apertures, the ends of the sleeve will be interengaged.

Figure 7:
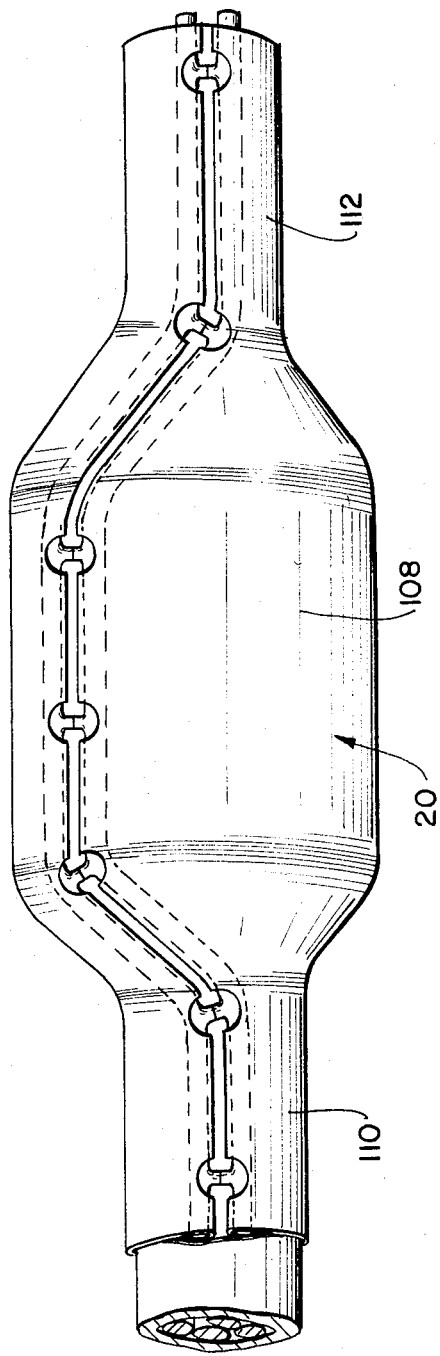
FIG. 7 is an elevational view showing how the protective sleeve of the present invention can be utilized with underlying conduits of varying diameter.

Finally, FIG. 7 illustrates the extreme versatility of the present invention which is provided, in part, by the flexibility of the plastic materials from which the rods 52 and 54 are formed. The embodiment illustrated in FIG. 7 is particularly adaptable for use in connection with medium and high voltage cable splices which must be protected by means of the sleeve. As shown, the central portion covered by the sleeve, which can be designated 108 is of a much greater diameter than the end portions covered by the sleeve which are designated respectively 110 and 112. It will be understood, of course, that the sleeve 20 is pre-molded to the approximate configuration shown, although somewhat larger in size to permit it to be slipped over the splice area. All of the male and female members will be interconnected with one another and the sleeve 20 will thus be loosely retained in position surrounding and protecting the splice. As the material 22 of the sleeve is exposed to the ambient air, it starts to shrink in size. Once it has shrunken sufficiently to engage in the splice itself, which is in the area designated 108, further shrinkage will be precluded. However, at the ends 110 and 112, which are beyond the splice at either end thereof, further shrinkage will continue until the sleeve reaches the diameter of the cable itself. When this occurs, further shrinkage at the area of 110 and 112 will then be precluded. At this point, the entire sleeve will be tightly engaged throughout its full length with the cable and the splice in the cable, thereby serving to protect and seal the splice.

After reading the foregoing detailed description, it will be apparent to those skilled in the art that various changes may be made in the materials, sizes and other non-essential features of the invention, without departing from the spirit and scope of the invention as defined in the accompanying claims.

What is claimed is:

1. A protective sleeve device adapted to be positioned in surrounding relationship around a juncture along a joined series of elongated pipes, cables, conduits or similar members, said sleeve device comprising:

a sheet of sleeve forming elastomeric material having first and second opposed side marginal areas which are juxtaposed to each other in confronting relationship when said sheet is wrapped in surrounding relationship around said juncture;

said first and second side edge marginal areas each including an end portion of said sheet folded back and attached to an adjacent portion of said sheet to form, respectively, first and second passageways;

first and second axially elongated rods having a spaced series of engagement means projecting therefrom transversely to the axis of elongation;

said first rod being disposed in said first passageway and said second rod being disposed in said second passageway;

said side marginal areas also having a spaced series of apertures formed therein in communication with said passageways;

said apertures along said first side marginal areas being aligned with those along said second side marginal areas when said marginal areas are in said juxtaposed position;

said engagement means projecting through said apertures to interlock said first rod and said second rod together and hence to retain said first and second side marginal areas in said juxtaposed position;

said engagement means being formed by alternating male and female connector members along each of said rods, with the male members projecting from said first rod being aligned opposite, and engaged with, the female members projecting from said second rod, and vice versa.

2. A sleeve device as defined in claim 1 wherein said male connector members comprise projections and wherein said female connector members comprise sockets into which said projections interfit.

3. A sleeve device as defined in claim 2 wherein said projections carry a retained locking pin and wherein said sockets include a hole into which said locking pin fits to releasably lock said male and female connectors together.

4. A sleeve device as defined in claim 1 wherein said engagement means includes a series of projecting hook members along each rod, said hook members on said first rod having an outer end portion adapted to receive and extend partially around a portion of said second rod, and vice versa.

5. A sleeve device as defined in claim 4 wherein said apertures are of sufficient magnitude to expose a portion of each of said rods extending through said passageways to enable said hook member outer end portions to extend through the apertures to engage with the exposed portions of said rods.

6. A sleeve device as defined in claim 1 wherein said rods are formed of flexible material.

7. A sleeve device as defined in claim 1 further including a flap of material adhered to said sheet and extending beneath said first and second marginal side areas when such marginal areas are in said juxtaposed position.

8. A sleeve device as defined in claim 1 wherein the elastomeric material for said sheet is chemically treated to cause said sheet to shrink when exposed to ambient air.

* * * * *